(12) United States Patent
Eschrich et al.

(10) Patent No.: US 6,176,810 B1
(45) Date of Patent: Jan. 23, 2001

(54) STARTER INTERLOCK SYSTEM FOR A MOTOR VEHICLE WITH AN AUTOMATIC GEAR BOX

(75) Inventors: Gerhard Eschrich, Tettnang; Günther Horsak, Meckenbeuren; Andreas Müller, Meerbusch, all of (DE)

(73) Assignee: ZF Friedrichshafen AG, Friedrichshafen (DE)

(*) Notice: Under 35 U.S.C. 154(b), the term of this patent shall be extended for 0 days.

(21) Appl. No.: 09/355,816

(22) PCT Filed: Apr. 8, 1998

(86) PCT No.: PCT/EP98/02023

§ 371 Date: Aug. 4, 1999

§ 102(e) Date: Aug. 4, 1999

(87) PCT Pub. No.: WO98/46877

PCT Pub. Date: Oct. 22, 1998

(30) Foreign Application Priority Data

Apr. 14, 1997 (DE) ................................. 197 15 384

(51) Int. Cl.⁷ .................................................. F02N 11/10
(52) U.S. Cl. ......................................................... 477/99
(58) Field of Search .................................................. 477/99

(56) References Cited

U.S. PATENT DOCUMENTS

| 5,009,295 | * | 4/1991 | Kinkade et al. | 477/99 |
| 5,377,641 | * | 1/1995 | Salazar | 477/99 |
| 5,445,575 | * | 8/1995 | Sundeen | 477/99 |

* cited by examiner

*Primary Examiner*—Dirk Wright
(74) *Attorney, Agent, or Firm*—Davis and Bujold

(57) ABSTRACT

For an automatic transmission a starter interlock system is proposed in which an electric position switch (2) and a starter switch (3) are located within the transmission. By moving the ignition key from the zero position to the position I, an electronic transmission controls system (1) is activated, which supplies the position switch (2) and the starter switch (3) with current.

6 Claims, 1 Drawing Sheet

STARTER INTERLOCK SYSTEM FOR A MOTOR VEHICLE WITH AN AUTOMATIC GEAR BOX

The invention concerns a starter interlock system for a motor vehicle with an automatic transmission in which the starting of a vehicle is prevented when a selector lever actuatable by a driver is in a position other than parking or neutral.

BACKGROUND OF THE INVENTION

Automatic transmissions are usually equipped with a starter interlock system. This serves the purpose that a vehicle can only be started when a selector lever, actuatable by the driver, is in neutral or parking position. Starting the vehicle in a driving position, e.g. R or D, is hereby prevented. Such a starter interlock system has the following units: ignition lock, starting relay, selector lever, electric position switch and an electronic transmission control system. The electric position switch coverts the position of the selector lever into electrical signals. In practice, this can be obtained by situating the position switch on a rotatable shaft and the position switch having inside several conductor tracks with sliding contacts or working without contact. The output signals of the electric position switch represents in coded form, e.g. as 4-bit code, the position of the selector lever. The signals are then passed to the electronic transmission control system. Two contacts are also integral parts of the position switch. The first contact serves to control the reverse drive headlights when the driver has introduced the position R via the selector lever. The second contact serves to control the starting operation. This contact can be designed as closing switch, i.e. when the selector lever is in position P or N, said mechanical contact is closed. In this position, a current path exists from the supply potential to the reference potential, via ignition lock, starter relay and closed position switch. The vehicle can be started.

The above described starter interlock system has been disclosed, e.g. in the book "Automatische Fahrzeuggetriebe," H. J. Forster, Springer Verlage, 1991, pages 344 to 347. The electric design of the position switch is known from the same book, FIG. 10.48 on page 392.

A new trend of development in automatic transmissions now moves toward reducing the interfaces of the automatic transmission and moving the electronics to the interior of the transmission. This development is known by the technical expression "Elektronik vor Ort" or "Mechatronik."

SUMMARY OF THE INVENTION

Departing from the above described prior art, the problem on which the invention is now based is further developed in the direction of "Elektronik vor Ort."

According to the invention, the problem is solved by the fact that on the electronic transmission control system two supply voltages are applied, the first supply voltage applied permanently and the second supply voltage applied when the ignition lock is moved to the first position. The application of the second supply voltage activates the electronic transmission control system which for its part supplies the position switch and the starter switch with current. The starter switch is not activated when the signals of the position switch indicate a driving position so that with moving of the ignition lock to the second position the starter relay remains deactivated. The starter switch is located within the automatic transmission and is designed as a semiconductor switch. The transmission control system detects the state of the starter switch via an informed variable.

The solution, according to the invention, offers the advantage that both the position switch and the starter switch are an integral part of the automatic transmission. By using the semiconductor switch as starter switch, the added advantage is obtained that the latter is short-circuitproof.

It is proposed in a development of the invention that the electronic transmission control system be activated by means of the first supply voltage when the informed variable of the starter switch indicates that the ignition lock has been moved to the second position and, at the same time, a failure of the second supply voltage has been found. This development substantially contributes to the operating safety of the vehicle. It is here assumed that as consequence of a line interruption the second supply voltage is not applied to the electronic transmission control system. The electronic transmission control system is then activated via the informed variable of the starter switch. This informed variable appears when the driver moves the ignition lock to the second position, i.e. when he intends to start the vehicle. After the electronic transmission control system has been activated, the position switch and the starter switch are supplied with current. The starter switch is controlled by the position switch according to the position of the selector lever. A perfect operation of the starter interlock system, i.e. a prevention of starting in a drive position, is thus also ensured when there is no second supply voltage applied to the electronic transmission control system. By using the informed variable as a signal for activating the electronic transmission control system, the advantage obtained is that no redundant, permanent supply voltage has to be fed to the semiconductor switch.

In a development of the invention, it is proposed that the electronic transmission control system has, in addition, a function block by means of which results a self-blocking of the informed variable of the starter switch. It is also proposed that the function block has a time stage, there being proposed in one other development that after lapse of the time stage the self-blocking is terminated so that the function block is deactivated. The advantage obtained with said developments is that even when the driver changes the ignition lock directly from the second position, back to the first position, the electronic transmission control system is nevertheless activated by the self-blocking function.

BRIEF DESCRIPTION OF THE DRAWING(S)

A preferred embodiment is shown in the drawing. In the drawing.

DESCRIPTION OF THE PREFERRED EMBODIMENT(S)

Figures 1, 2:
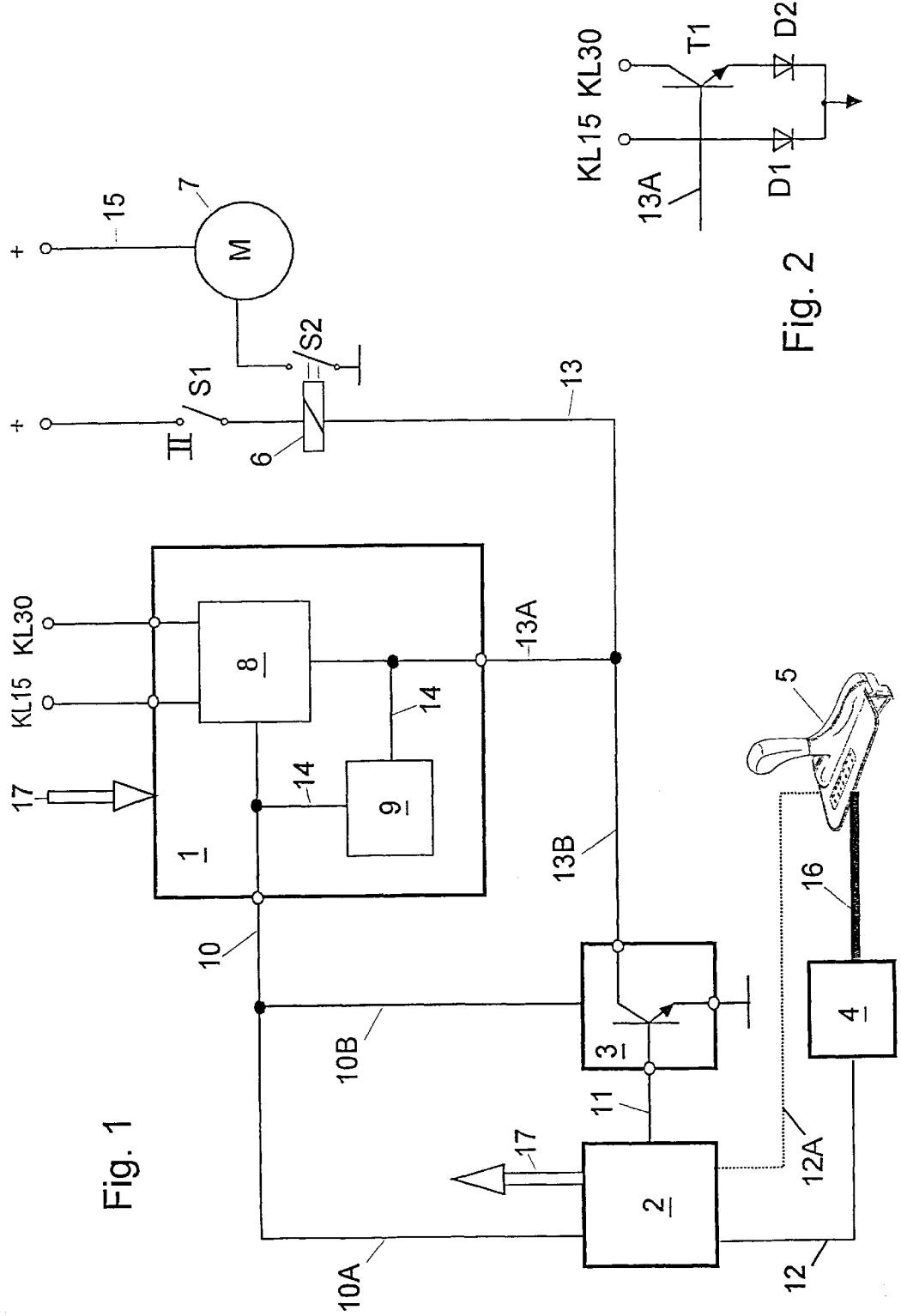
FIG. 1 is a system diagram.
FIG. 2 is one OR linkage of the two supply voltages.

FIG. 1 shows a system diagram consisting of one electronic transmission control system 1, one selector lever 5, one shift valve 4, one electric position switch 2, one starter switch 3 and one starter relay 6. The electric position switch 2, the starter switch 3 and the shift valve 4 are integral parts of the automatic transmission. The electronic transmission control system 1 can also be an integral part of the automatic transmission by forming a common unit with the hydraulic control unit. In an extensively simplified form, the electronic transmission control system shows a control electronics 8 and a function block 9. At the same time, FIG. 1 shows, in addition, a switch S1 which constitutes the ignition lock, a starter M, reference numeral 7, and a closing contact S2 connected with the starter relay 6. In a perfect state, the operation of the starter interlock system is as follows: in the output state, i.e. the ignition block is in the zero position, only the first supply voltage KL30 is applied to the electronic transmission control system 1. The electronic transmission control system 1 is not activated. From the electronic control system 1, one output line 10 leads with the branches 10A and 10B to the electric position switch 2 and to the starter switch 3. The line 10 serves for the voltage supply of the electric position switch 2 and a starter switch 3. In a non-activated state, the line 10 has no voltage. Since the electric position switch 2 is currentless, it thus delivers no output signals 17 to the electronic transmission control system 1.

If a driver now moves the ignition lock to the position 1, a second supply voltage KL15 abuts on the electronic transmission control system. As soon as the second supply voltage is applied to on the electronic transmission control system 1, the latter is activated. As a consequence of this, the electric position switch 2 and the starter switch 3 become supplied with current. The electric position switch 2 detects the position of a shift valve 4, via a connection 12. Obviously, it is also possible that the position switch 2 directly detects the position of the selector lever 5, as shown in dotted lines in FIG. 1 with the reference numeral 12A. The shift valve 4 is locked within a hydraulic control unit (not shown) of the automatic transmission. For its part, the shift valve 4 is connected, via a mechanical connection 16, such as a rod with a selector lever 5. The driver can determine the position of the automatic transmission by said selector lever. Such a selector lever usually has the positions P, R, N, D, etc. The electric position switch 2 converts the position of the shift valve 4 or of the selector lever into electric output signals 17. The latter can be shown, e.g. as 4-bit code. Via the output signals 17, which are passed to the electronic transmission control system 1, the latter detects the position introduced by the selector lever 5. If it is now assumed that the selector lever 5 is in the position P or N, the electronic position switch 2 activates, via the line 11, the starter switch 3. The starter switch 3 is designed as a semiconductor switch. In activated state, a connection thus exists of one line 13B to the reference potential. The electric position switch 2 can be designed as mechanical switch or as Hall element, as known from the prior art. The starter switch 3 is short-circuitproof. If a driver now intends to start the vehicle, he moves the ignition lock to a position 11. Thereby the switch S1 becomes closed in a line 13, i.e. thus there is a current path from the positive potential (+) to the reference potential, via switch S1, starter relay 6, via line 13, 13B and starter switch 3. As consequence of this, the starter relay 6 actuates and closes for its part a switch S2 so that the starter M, reference numeral 7, is actuated via line 15.

In a second example, it is now assumed that the second supply voltage KL15 is not applied to the electronic transmission control system 1. This can occur, e.g. as result of a line interruption of a defective fuse situated in the voltage supply line. If the driver moves the ignition lock out of the zero position to the first position, the electronic transmission control system 1 remains in inactive state. If the ignition lock is moved to the first position, then the supply voltage, usually 12V, is applied to the electronic transmission control system 1, via switch S1, starter relay 6, line 13 and line 13A. Via the potential that now appears on the line 13A, the electronic transmission control system 1 is activated, the so-called "wake up". The first supply voltage KL30 here serves as substitute for the missing second supply voltage KL15. For this purpose, both supply voltages are crossed via an OR function. The concrete development of the OR function is shown in FIG. 2. The first supply voltage KL30 is only engaged for the starting operation. After the electronic transmission control system 1 is activated, it supplies with current, via line 10 and branches 10A and 10B, the electric position switch 2 and starter switch 3.

The further cycle develops like described in example 1. The electronic transmission control system 1 has in addition a function block 9. The latter is placed in a feedback branch 14. The feedback branch 14 leads from the line 10 to the line 13A. The task of the feedback branch 14 with the function block 9 is to ensure a self-support of the line 13A, i.e. even in the case that the driver in the second example directly moves the ignition block out of the position 11 to the position 1, it is ensured that the electronic transmission control system 1 remains activated by means of the self-support. The function block 9 additionally contains a time stage. After expiration of the time stage, the self-blocking is deactivated. This time stage is selected so that the time duration suffices for the start of the motor. By moving the selector lever 5 to a driving position, a driving step or emergency running gear is purely hydraulically introduced by means of the shift valve 4.

In FIG. 2 is shown an OR linkage of the first and second supply voltages. In the perfect operation the battery voltage, e.g. 12V, abuts permanently on the first supply voltage KL30. The line 13A is currentless so that the transistor T1 is in locked state. This prevents the occurrence of an additional stand-by consumption when the vehicle is shut down. With the passage of the ignition lock from the position zero to the position 1, a voltage potential abuts on the second supply voltage KL15. The diode D1 becomes conductive and activates the electronic transmission control system 1. When the line of the second supply voltage KL15 is interrupted, there is no voltage potential. As described in FIG. 1, during passage of the ignition lock from the position I to the position I1, the positive potential of the battery is now passed, via the line 13A, to the transistor T1 so that the latter is engaged. The first supply voltage KL30 is connected, via the diode D2, to the electronic transmission control system 1 so that the latter is activated. Thus the first supply voltage KL30 serves as substitute for the activation of the electronic transmission control system 1 when the second supply voltage KL15 fails. The position, parked or neutral, is also thus perfectly detected in the absence of the second supply voltage.

Reference numeral
1 electric transmission control system
2 electric position switch
3 starter switch
4 shift valve
5 selector lever
6 starter relay
7 starter
8 control electronics
9 function block
10 line
11 line
12 connection
12A line
13 line
14 feedback branch
15 line
16 mechanical connection
17 signal position switch

What is claimed is:
1. An ignition interlock system for a vehicle having an automatic transmission in which starting of the vehicle is prevented when a driver actuated selector lever (5) is in a position other than parked or neutral, the ignition interlock system comprising:

an ignition lock (S1) having a first and second positions, a starter relay (6) interposed between the ignition lock (S1) and a vehicle starter motor (7);

a starter switch (3) and an electric position switch (2) for detecting the position of the driver actuated selector lever (5) and sending a signal to an electronic transmission control system (1), said electronic transmission control system (1) comprising two voltage supplies, the first voltage supply (KL30) permanently energizing the electronic control system (1) without activating the electronic control system (1) to supply current to the position switch (2) and the starter switch (3) when the ignition lock (S1) is in the first position;

the second supply voltage (KL15) activating the electronic control system (1) to supply current to the position switch (2) and the starter switch (3) when the ignition lock (S1) is moved to the second position and said position switch (3) returns the signal to the electronic transmission control system (1) indicating the selector lever (5) is in one of a driving position and a neutral or parking position;

where the selector lever is in the driving position, said starter relay (6) remains deactivated, and in the neutral or parking position, said starter relay (6) is activated and a vehicle starter motor is energized;

said starter switch (3) is a semiconductor switch and said electronic transmission control system (1) detects via an informed variable the state of said starter switch (3); and wherein the informed variable of said starter switch (3) indicates that said ignition lock (S1) has been moved to the second position and upon failure of one of said first (KL30) and second supply voltages (KL15), the electronic transmission control system (1) is activated solely by the remaining first (KL30) and second supply voltage (KL15).

2. The starter interlock system according to claim 1, wherein in said electronic transmission control system (1) the first (KL30) and second (KL15) voltage supplies are interconnected by an OR linkage.

3. The starter interlock system according to claim 2, wherein said electronic transmission control system (1) further comprises a self supporting function block (9) which ensures that the electronic transmission control system (1) remains activated upon movement of the ignition lock (S1) from the second position to the first position.

4. The starter interlock system according to claim 3, wherein said function block (9) has in addition, a time stage.

5. The starter interlock system according to claim 4, wherein after lapse of the time stage the self-supporting function block (9) is deactivated.

6. An ignition interlock system for a vehicle having an automatic transmission in which starting of the vehicle is prevented when a driver actuated selector lever (5) is in a position other than parked or neutral, the ignition interlock system comprising:

an ignition lock (S1) having a first and second positions, a starter relay (6) interposed between the ignition lock (S1) and a vehicle starter motor (7);

a starter switch (3) and an electric position switch (2) for detecting the position of the driver actuated selector lever (5) and sending a signal to an electronic transmission control system (1), said electronic transmission control system (1) comprising two voltage supplies, the first voltage supply (KL30) permanently energizing the electronic control system (1) without activating the electronic control system (1) to supply current to the position switch (2) and the starter switch (3) when the ignition lock (S1) is in the first position;

the second supply voltage (KL15) activating the electronic control system (1) to supply current to the position switch (2) and the starter switch (3) when the ignition lock (S1) is moved to the second position and said position switch (3) returns the signal to the electronic transmission control system (1) indicating the selector lever (5) is in one of a driving position and a neutral or parking position;

where the selector lever is in the driving position, said starter relay (6) remains deactivated, and in the neutral or parking position, said starter relay (6) is activated and a vehicle starter motor is energized;

said starter switch (3) is a semiconductor switch and said electronic transmission control system (1) detects via an informed variable the state of said starter switch (3); and wherein within said electronic transmission control system (1) the first (KL30) and second (KL15) voltage supplies are interconnected by an OR linkage to ensure the electronic transmission control system (1) can be activated solely by means of the first supply voltage (KL30) when the second supply voltage (KL15) fails and the informed variable of said starter switch (3) indicates that said ignition lock (S1) has been moved to the second position.

* * * * *